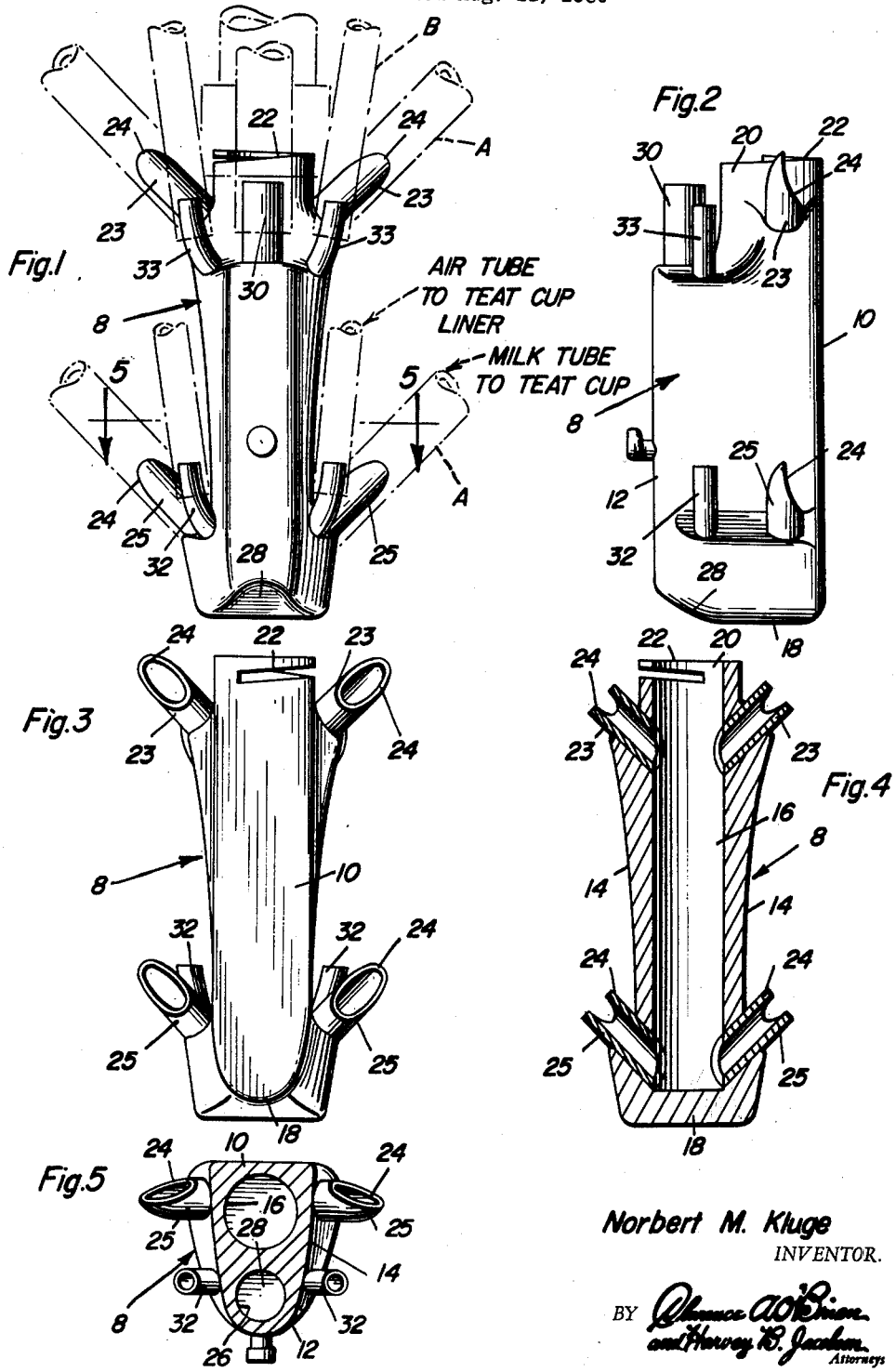

United States Patent Office 3,072,096
Patented Jan. 8, 1963

1

3,072,096
CLAW FOR MILKING MACHINES
Norbert M. Kluge, Rte. 1, Cumberland, Wis.
Filed Aug. 11, 1960, Ser. No. 48,952
1 Claim. (Cl. 119—14.54)

The present invention relates to mechanized milking and has to do with certain new and useful improvements in assembly line milk producing systems and, more particularly, to a claw, that is, an improved claw for communicatively coupling the milk and air lines with the customary tubes employed in a conventional type teat cup assembly.

It goes without saying that labor shortages and constant demands for dairy products are aspects of an over-all problem which call for constant revaluation of dairy farming procedures. It follows that enterprising dairymen are continuously searching the market for better procedures and equipment. It follows that one obvious purpose of the instant invention is to structurally, functionally and otherwise improve on milking claws. Persons conversant with this line of endeavor are aware that many and varied forms and styles of claws have been advocated for use and, as a matter of fact, a number of patents have been granted on claws which are said to be satisfactory solutions of the over-all problem.

While a number of prior patents of possible interest might be referred to here, it is perhaps best to make reference only to the Bender et al. milking apparatus or claw No. 2,429,983. This is mentioned due to the fact that it is characterized by a substantially hollow body, a plurality of hose attaching nipples communicating with the recess or chamber in the body and which serve to deliver the milk from the milk tubes into the body, there being a milk line communicatively attached to said body. In addition, a plurality of nipples are also supported on the body in a manner to connect the air tubes of the teat cup assembly to the air or vacuum line.

In carrying out the principles of the instant invention a highly improved construction involving a more systematic arrangement and association of component parts is utilized. Comparing the instant endeavor with the Bender et al. and other patents having to do with claws, certain significant and improved results may be touched upon. To this end, a one-piece elongated body is employed and provided with a lengthwise main milk channel or passage. The inner ends of milk tube nipples communicate with this channel, the nipples being disposed at 45 to 60 degree angles. Somewhat more broadly recited the stated nipples are at inclined angles with the axes of the bores thereof oblique to the longitudinal axis of the aforementioned main milk channel and while the preferred angularity is 45 degrees as stated, this angle may vary as much as 20 degrees either way and still maintain the intended efficiency of operation of the claw.

Stated otherwise, the present invention has to do with a milking machine claw which is characterized by a body having a first passage providing a milk accumulating channel closed at one end and connectible at an open end thereof to a milk take-off line, a pair of front milk intake nipples communicating at inner ends with said passage, a pair of companion rear nipples likewise communicating with said passage, the axes of all of said nipples being at oblique angles to the lengthwise axis of said first passage, said body having a second passage for air and being further provided with communicating additional nipples, the first named pairs of nipples adapted to be connected with teat cup milk tubes, and the additional nipples being adapted to be connected with air tubes provided therefor on said teat cups.

Constructed along a slightly different interpretive line

2 the invention pertains to a body having non-communicating milk and air passages and having tube connecting nipples communicating therewith, said passages being closed at one end and open at their other ends, the latter ends being connectible to said air and milk lines, said body being made of a heavy material and weighing slightly in excess of three (3) pounds, whereby to cause the inflation massage step to promote a more satisfactory release action between regular pulsation strokes and minimizing harsh pulling of the cow's teats.

A claw having the structural features so far referred to, and others which will be set forth later, offers a number of advantages. That is to say, it keeps the teat cups from crawling up on the udder, which result has been known to shut off the flow of milk from the teats. The weight factor is significant in that the instant claw can be used to advantage and tension can be applied more uniformly on all four teats, resulting in faster and more gentle milking and promoting cooperative responsiveness of the cow being milked.

It may be also mentioned here that the claw herein disclosed has been actually perfected and used and has repeatedly revealed that the tension is administered so evenly, so to speak, that the vacuum can be reduced to 9 inches or less. It may be recalled that the vacuum on ordinary milking machines is between 12 and 15 inches. With this invention there is no need to remove one or more teat cups before milking of the cow is finished. In fact, the cow is milked out completely and thoroughly with the aid of the improved claw and hand finishing does not have to be resorted to.

It is also significant to note that with this invention the teat cups can remain on the cow until she is completely milked which is very essential for the utmost sanitation. No foul air can enter the milk pail or bulk tank as the case may be.

Experience also shows that with the improved milk claw undue stress and strain on the cow's udder and teats is reduced to a minimum, congestion does not have to be contended with and the cow is so little disturbed that she rarely if ever holds up her milk in ways so often noticeable when improperly constructed claws are in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view showing the improved claw and which may be described as a bottom plan view.

FIG. 2 is a view in side elevation of the claw.

FIG. 3 is a top plan view.

FIG. 4 is a horizontal longitudinal section through the main passage or milk channel.

FIG. 5 is a cross section on the line 5—5 of FIG. 2, looking in the direction of the arrows.

Referring now to the views of the drawings it will be noted that the elongated cast metal or equivalent body is denoted, as an entity, by the numeral 8. The top side (FIG. 3) may be said to be substantially flat as at 10. The diametrically opposite bottom side 12 is reduced in cross-section and is convex in a lengthwise direction. This is particularly brought out in FIG. 5. The sides 15 slope slightly downwardly and inwardly from the top to the bottom as shown in FIG. 5. This body may be said to be made up of upper and lower half-portions. The upper half-portion is provided with a longitudinal bore or passage 16 closed at one end as at 18 and having the opposite end open at 20 and this end portion being provided with an end portion 22 which facilitates the connection of a milk line hose (not shown) thereto. It will be noticed that there are four milk tube connecting nipples joined at their inner ends to this upper half-portion. More specifically, these nipples are at oblique angles and communicate at their inner ends with the passage or main milk channel 16. The axes of the nipples are at oblique angles to the longitudinal axis of the passage 16 and as already stated a 45 degree angle is preferred but there should be a leeway of some 20 degrees in respect to the exact obliquity adopted. The free or outer end portions of these nipples are mitered as at 24 to facilitate connecting the milk tubes A thereto as shown in phantom lines in FIG. 1. These nipples are arranged in front and rear pairs. The nipples at the front are conveniently denoted by the numeral 23 and those constituting the rear pair are conveniently denoted at 25. All of the nipples project approximately the same distance and have corresponding cut-off terminals 24. In practice, four tubes or hoses A are provided in the teat cup assembly and these hoses are connected to the teat cups in a well known manner and the teat cups themselves are constructed to include inner pulsating liners contained in outside comparatively rigid cups. It will be understood, however, that the invention here is in the claw and not the teat cup assembly except and insofar as the assembly may be considered in combination with the claw in taking milk from the teats of the udder and delivering it into the milk line and using the air line, as the case may be.

The lower half-portion of the body is of similar construction in that another passage 26 (FIG. 5) is provided. This passage is of a cross-section less than the cross-section of the passage 16 but is of the same length and is in spaced parallelism in the manner shown. It is also closed at its rearward end as at 28. The front end is provided with a reduced neck 30 to which the air conduit or line (not shown) is connected. It is also noticeable that the slightly curved nipples here, which are also rigid, are arranged in pairs. The nipples of the rearward pair are denoted at 32 and these nipples are directly under or in line with the rear milk tube nipples 25. The forward pair of nipples are arranged substantially beneath the front or forward milk nipples and the air nipples are here denoted by the numeral 33. It follows that the upper half-portion is characterized by the main milk channel 16 and the front nipples 23 and rear nipples 25 at 60 degree angles, with the passage 16 closed at 18 and the other end open and suitably constructed for connection of a milk line (not shown) thereto. The air tubes are shown in phantom lines in FIG. 1 and are denoted by the letter B and they are obviously connected to the smaller curvate air nipples 32 and 33. It has been found that a claw constructed in accordance with the principles of this invention results in the claw being applied and suspended so that the weight on the udder and the teats is evenly distributed. This equalized weight principle results in a more gentle but effective operation of the teat cup assembly. Equalized attachment of the claw to each teat results in a more natural life-like feeling of the teat cup massage function. Good balance and equalized suspension promotes gentleness that soothes and stimulates the cow's nervous system so that she produces more hormone secretion of the pituitary gland which results in the cow giving her milk rapidly and quite completely indeed.

The over-all weight of the claw is approximately 3¼ pounds and it has been repeatedly observed that this controlled weight principle obviates undesirable harsh pulling actions that ordinarily cause irritation and stress. The fact is that the adoption and use of a claw of correct weight (recognized by this applicant as being 3¼ pounds) promotes a more complete release action between intermittent pulsation strokes. Such gentleness encourages a cow to become relaxed, improves the free flow of milk, affords a better break in the column of milk flow and creates a higher degree of velocity for better washing results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A milking machine claw comprising a unitary body having a first passage providing a milk accumulating channel closed at one end and connectible at an open end thereof to a milk take-off line, a pair of front milk intake nipples communicating at inner ends with said passage, a pair of companion rear milk nipples likewise communicating with said passage, the axes of all of said nipples being at oblique angles to the lengthwise axis of said first passage, said body having a second passage for air and being further provided with communicating additional nipples, the first named pairs of nipples adapted to be connected with teat cup milk tubes, and the additional nipples being adapted to be connected with air tubes provided therefor on said teat cups, said body being elongated, said first-passage being straight and of uniform cross-section from end to end, said additional nipples being arranged in front and rear pairs and positioned directly beneath their respective front and rear intake nipples and, in addition, being disposed in a plane common to each other, the obliquity of the angles of said nipples relative to the axes of said milk channel and air passage, respectively, being predetermined relative to the usable plane of said first passage, all of said nipples being disposed in a horizontal plane, being joined to diametrically opposite sides of the body and all portions of said first-named pairs of nipples being disposed in a plane inwardly of the plane of the top surface of said body.

References Cited in the file of this patent

UNITED STATES PATENTS

| | | |
|---|---|---|
| 1,366,205 | Moldenhauer | Jan. 18, 1921 |
| 1,417,801 | Cook | May 30, 1922 |
| 2,204,677 | Hodsalon | June 18, 1940 |
| 2,428,350 | Anderson | Oct. 7, 1947 |

FOREIGN PATENTS

| | | |
|---|---|---|
| 422,177 | Great Britain | Jan. 7, 1935 |
| 112,539 | Australia | Feb. 12, 1941 |